(12) United States Patent
Campbell et al.

(10) Patent No.: US 6,322,236 B1
(45) Date of Patent: Nov. 27, 2001

(54) OPTICAL FILM WITH DEFECT-REDUCING SURFACE AND METHOD FOR MAKING SAME

(75) Inventors: Alan B. Campbell, Petaluma; Andrew McKee, San Jose, both of CA (US); Sanford Cobb, Jr.; Wade D. Kretman, both of St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/246,970

(22) Filed: Feb. 9, 1999

(51) Int. Cl.$^7$ .................................................. F21V 5/08
(52) U.S. Cl. ......................... 362/333; 362/19; 362/330; 362/331; 385/901
(58) Field of Search .................... 362/31, 326, 26, 362/331, 19, 330, 333; 349/62, 65; 385/129, 130, 146, 901

(56) References Cited

U.S. PATENT DOCUMENTS

| | | | |
|---|---|---|---|
| Re. 29,091 | 12/1976 | De Palma et al. | 359/494 |
| 720,139 | 2/1903 | Hartung | 359/594 |
| 1,092,114 | 3/1914 | Mygatt | 362/337 |
| 2,404,222 | 7/1946 | Doner | 409/304 |
| 2,804,801 | 9/1957 | Mihalakis | 359/459 |
| 2,984,152 | 5/1961 | Mihalakis | 359/459 |
| 3,063,339 | 11/1962 | Mihalakis et al. | 359/452 |
| 3,124,639 | 3/1964 | Kahn | 359/488 |
| 3,610,729 | 10/1971 | Rogers | 359/488 |
| 3,711,176 | 1/1973 | Alfrey, Jr. et al. | 359/359 |
| 3,754,811 | 8/1973 | Hoadley et al. | 359/454 |
| 3,754,813 | 8/1973 | Depalma et al. | 359/454 |
| 3,765,281 | 10/1973 | Wolfe et al. | 83/875 |
| 3,788,171 | 1/1974 | Hoadley et al. | 83/875 |
| 3,809,457 | 5/1974 | Kurtz et al. | 359/455 |
| 3,860,036 | 1/1975 | Newman, Jr. | 138/45 |
| 3,977,766 | 8/1976 | Langworthy et al. | 359/454 |
| 3,994,562 | 11/1976 | Holzel | 359/459 |
| 4,398,804 | 8/1983 | Yokoi | 350/337 |
| 4,446,305 | 5/1984 | Rogers et al. | 528/348 |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,576,850 | * 3/1986 | Martens | 428/156 |
| 4,720,426 | 1/1988 | Englert et al. | 428/344 |
| 5,123,077 | * 6/1992 | Endo et al. | 385/129 |
| 5,188,760 | 2/1993 | Hikmet et al. | 252/299.01 |
| 5,211,878 | 5/1993 | Reiffenrath et al. | 252/299.63 |

(List continued on next page.)

FOREIGN PATENT DOCUMENTS

| | | |
|---|---|---|
| 535324 | 4/1993 | (EP) . |
| WO 96/22590 | 7/1996 | (WO) . |

*Primary Examiner*—Alan Cariaso
(74) *Attorney, Agent, or Firm*—William D. Miller

(57) ABSTRACT

An optical film has surface that reduces the occurrence of optical defects in a display using the film. In particular, the surface has randomized characteristics that reduce such defects as wet-out, Newton's rings, and Moiré effects. The film has a first surface free of regular structure, the first surface having a plurality of local height maxima, a characteristic measure of the first surface having a random value within a predetermined range. The film also has a second surface opposing the first surface. A method of making an optical film includes embossing a pattern lacking regular structure onto a first surface of a film, wherein the first surface has a plurality of local height maxima, a characteristic measure of the first surface having a random value within a predetermined range. The characteristic measure may be a difference between the actual heights and a nominal height of the film surface, average separation between the local height maxima on the surface, or slope angle of the first surface proximate a local height maximum.

63 Claims, 11 Drawing Sheets

U.S. PATENT DOCUMENTS

| | | | |
|---|---|---|---|
| 5,235,443 | 8/1993 | Barnik et al. | 349/194 |
| 5,245,454 | 9/1993 | Blonder | 359/70 |
| 5,269,995 | 12/1993 | Ramanathan et al. | 264/173.12 |
| 5,294,657 | 3/1994 | Melendy et al. | 524/270 |
| 5,316,703 | 5/1994 | Schrenk | 264/1.34 |
| 5,319,478 | 6/1994 | Fijnfschilling et al. | 349/181 |
| 5,389,324 | 2/1995 | Lewis et al. | 264/173.12 |
| 5,394,255 | 2/1995 | Yokota et al. | 359/49 |
| 5,448,404 | 9/1995 | Schrenk et al. | 359/584 |
| 5,486,935 | 1/1996 | Kalmanash | 349/194 |
| 5,486,949 | 1/1996 | Schrenk et al. | 359/498 |
| 5,612,820 | 3/1997 | Schrenk et al. | 359/498 |
| 5,629,055 | 5/1997 | Revol et al. | 428/1.31 |
| 5,686,979 | 11/1997 | Weber et al. | 349/96 |
| 5,699,188 | 12/1997 | Gilbert et al. | 359/584 |
| 5,721,603 | 2/1998 | De Vaan et al. | 349/194 |
| 5,744,534 | 4/1998 | Ishiharada et al. | 524/442 |
| 5,751,388 | 5/1998 | Larson | 349/96 |
| 5,767,935 | 6/1998 | Ueda et al. | 349/112 |
| 5,770,306 | 6/1998 | Suzuki et al. | 428/328 |
| 5,771,328 * | 6/1998 | Wortman et al. | 385/146 |
| 5,783,120 | 7/1998 | Ouderkirk et al. | 264/1.34 |
| 5,793,456 | 8/1998 | Broer et al. | 349/98 |
| 5,808,794 | 9/1998 | Weber et al. | 359/487 |
| 5,825,542 | 10/1998 | Cobb, Jr. et al. | 359/487 |
| 5,825,543 | 10/1998 | Ouderkirk et al. | 359/494 |
| 5,831,774 * | 11/1998 | Toshima et al. | 359/707 |
| 5,944,405 * | 8/1999 | Takeuchi et al. | 362/31 |
| 5,995,288 * | 11/1999 | Kashima et al. | 359/599 |

* cited by examiner

OPTICAL FILM WITH DEFECT-REDUCING SURFACE AND METHOD FOR MAKING SAME

BACKGROUND

The present invention is directed generally to a light transmissive film, and particularly to a film that reduces the incidence of defects in a display.

The use of films for displays is well known. For example, in backlit displays, brightness enhancement films use a prismatic structure to direct light along the viewing axis, thus enhancing the brightness of the light perceived by the viewer. As another example, a backlit computer display screen may use a number of different films in order to produce a screen with high contrast and high overall brightness, while simultaneously maintaining high, uniform brightness in certain selected directions and lower brightness in other directions. Such screens may use several types of films, such as diffusing films, in combination with a prismatic film or a lenticular film.

One problem with using films in a display is that the cosmetic requirements for a display intended for close viewing, such as a computer display, are very high. This is because such displays are viewed closely for long periods of time, and so even very small defects may be detected by the naked eye, and cause distraction to the viewer. The elimination of such defects can be costly in both inspection time and in materials.

Defects are manifested in several different ways. There are physical defects such as specks, lint, scratches, inclusions etc., and also defects that are optical phenomena. Among the most common optical phenomena are "wet-out" and Newton's rings. "Wet-out" occurs when two surfaces optically contact each other, thus effectively removing the change in refractive index for light propagating from one film to the next. This is particularly problematic for films that use a structured surface for their optical effect, since the refractive properties of the structured surface are nullified. The effect of "wet-out" is to create a mottled and varying appearance to the screen. Newton's rings are the result of a slowly varying air gap between two films, as may be created by a particle of dust between two films. Newton's rings may be formed in transmission or in reflection. The result of Newton's rings is that the viewer perceives a contour pattern on the screen that may be distracting.

Several approaches have been followed to overcome the problem of defects in multiple-film display assemblies. One is simply to accept a low yield of acceptable display assemblies produced by the conventional manufacturing process. This is obviously unacceptable in a competitive market. A second approach is to adopt very clean and careful manufacturing procedures, and impose rigid quality control standards. While this may improve the yield, the cost of production is increased to cover the cost of clean facilities and inspection.

Another approach to reducing defects is to introduce a diffuser to the display, either a surface diffuser or a bulk diffuser. Such diffusers may mask many defects, and increase the manufacturing yield at low additional cost. However, the diffuser scatters light and decreases the on-axis brightness of light perceived by the viewer, thus reducing the performance.

There continues to be a need to reduce the occurrence of defects in displays, so that the manufacturing yield may be improved with little additional cost while, at the same time, maintaining performance.

SUMMARY OF THE INVENTION

Generally, the present invention relates to a surface on a film that may be used to reduce the occurrence of optical defects in a display that uses the film. In particular, the surface has randomized characteristics that reduce such defects as wet-out, Newton's rings, and Moiré effects. The invention also relates to a method for making the film, a tool used for making the film, and a method of making the tool.

In one embodiment the film has a first surface free of regular structure, the first surface having a plurality of local height maxima, a characteristic measure of the first surface having a random value within a predetermined range. The film also has a second surface opposing the first surface. A method of making an optical film includes embossing a pattern lacking regular structure onto a first surface of a film wherein the first surface has a plurality of local height maxima, a characteristic measure of the first surface having a random value within a predetermined range. The characteristic measure may be a difference between the actual heights and a nominal height of the film surface, average separation between the local height maxima on the surface, or slope angle of the first surface proximate a local height maximum.

In another embodiment, the invention includes a film having an anti-wet-out surface on a first surface having no regularly refractive structure, and a second surface opposing the first surface. In another embodiment, the film includes a first surface, and wet-out reducing means disposed on the first surface for reducing wet-out between the first surface and another optical surface.

In another embodiment of the invention, an optical device includes a light source, and a film having an anti-wet-out surface on a first surface having no regularly refractive structure. A second optical component has a second surface opposing the first surface, and light from the light source passes through the film and the second optical component.

In another embodiment of the invention, a method of making an optical film includes forming an anti-wet-out surface on a first surface of the optical film.

In another embodiment of the invention, a method of making a drum for embossing a surface on a film includes rotating a drum around a rotation axis relative to a cutting tool, cutting the surface of the drum with the cutting tool, and randomly varying a cutting characteristic of the cutting tool to produce characteristic variations lying randomly within a predetermined range. A drum for embossing a surface on a film includes a surface free of regular structure and having a plurality of local height minima, a characteristic measure of the surface having a random value within a predetermined range.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 2A:
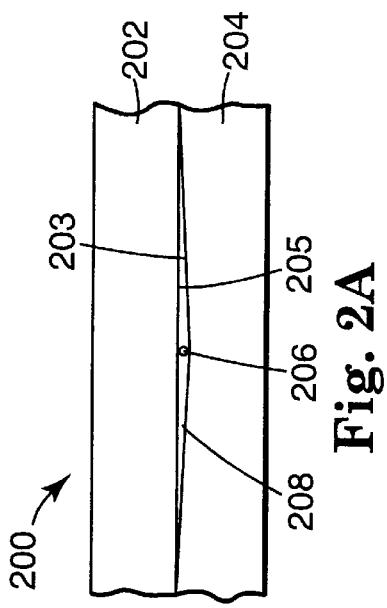
FIGS. 2A and 2B illustrate the problem of Newton's rings formed between adjacent films.
Figure 2B:
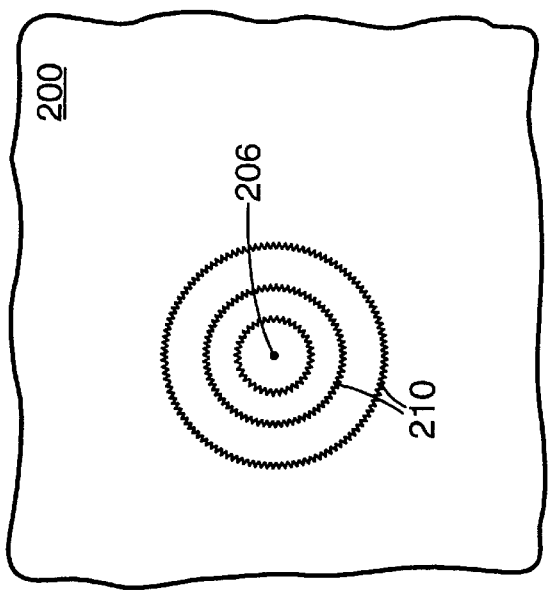

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to light management films, and is believed to be particularly suited to light management films for use with liquid crystal displays used as computer displays or monitors. The invention is also useful in other areas where multiple light management films are used, such as in rear projection screens and in overhead projection displays. One of the advantages of the invention is that the intensity of defects on the viewing area is reduced, thereby increasing the manufacturing yield.

The invention is described below, for the purposes of illustration, in the particular application of multiple-film liquid crystal computer displays. It will be appreciated that the use of the invention is not so limited and that there is a wide range of applications having multiple light management films where the invention may be useful.

Figure 1A:
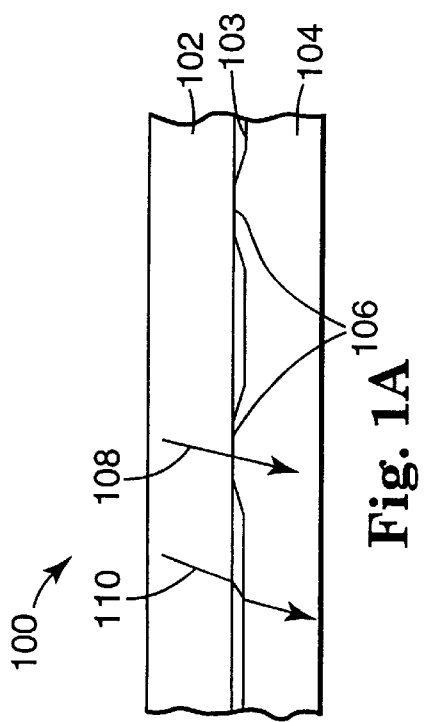
FIGS. 1A and 1B illustrate the problem of "wet-out" occurring between adjacent films.
Figure 1B:
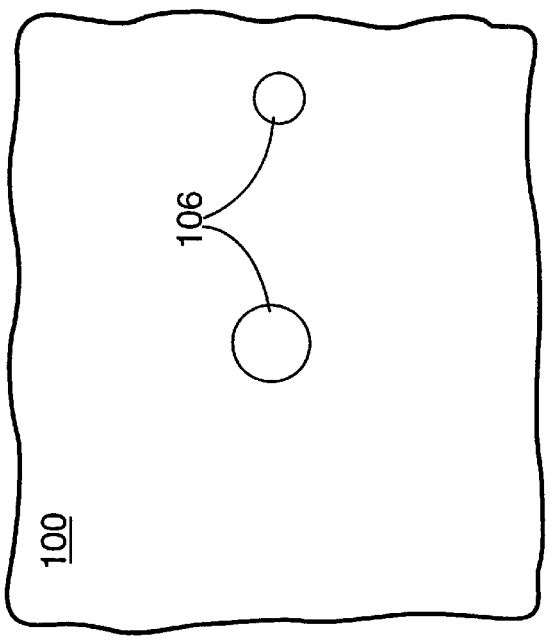

Wet-out and Newton's rings are optical phenomena that are sources of defects for multi-layer displays. FIGS. 1A and 1B illustrate the problem of wet-out in a multi-layer film 100. The multi-layer film 100 is shown to have at least two layers 102 and 104. The upper surface 103 of the second film 104 is optically contacted at optical contacting portions 106 to the upper film 102. When optical contacting occurs, any light that passes through an optically contacted region 106 passes from one film into the next with a reduced refractive effect. Where the refractive indices of the upper and lower films 102 and 104 are identical, there is no refractive effect. In contrast, where light passes from one film to the other where there is no optical contacting, for example as shown for ray 110, the light is refracted at each film-air interface. The result is that the viewer detects the wet-out regions 106 as being regions where the transmissive properties are different from the surrounding area and are therefore viewed as an abnormality or a defect.

Another source of defects is the formation of Newton's rings, which may be viewed either in transmission or reflection. Newton's rings may be formed in a multi-layer display 200, having at least two films 202 and 204. A particle of dust 206 may be trapped between the two films 202 and 204, resulting in an air gap 208 between respective lower and upper surfaces 203 and 205 of the upper and lower films 202 and 204. The separation between the two surfaces 203 and 205 varies with distance from the dust particle 206. Interference rings are formed by light passing through the display 200 where the air gap 208 is a multiple of half wave lengths of light, as is commonly understood for the formation of Newton's rings. The effect is particularly pronounced where the separation between the two surfaces 203 and 205 is less than approximately 1.5 $\mu$m, since white light fringes may be formed. If the separation between the surfaces 203 and 205 is more than approximately 1.5 $\mu$m, the effect is less pronounced, since the fringes are color-specific, and not white-light fringes, and are not perceived by the viewer as readily as white light fringes.

Figure 3A:
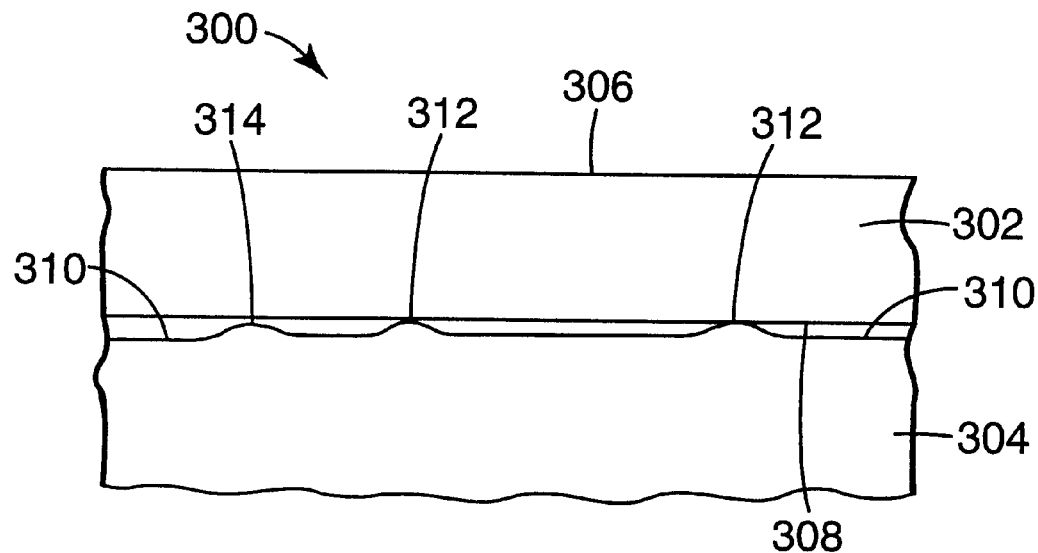
FIGS. 3A and 3B illustrate a film structure according to an embodiment of the present invention.
Figure 3B:
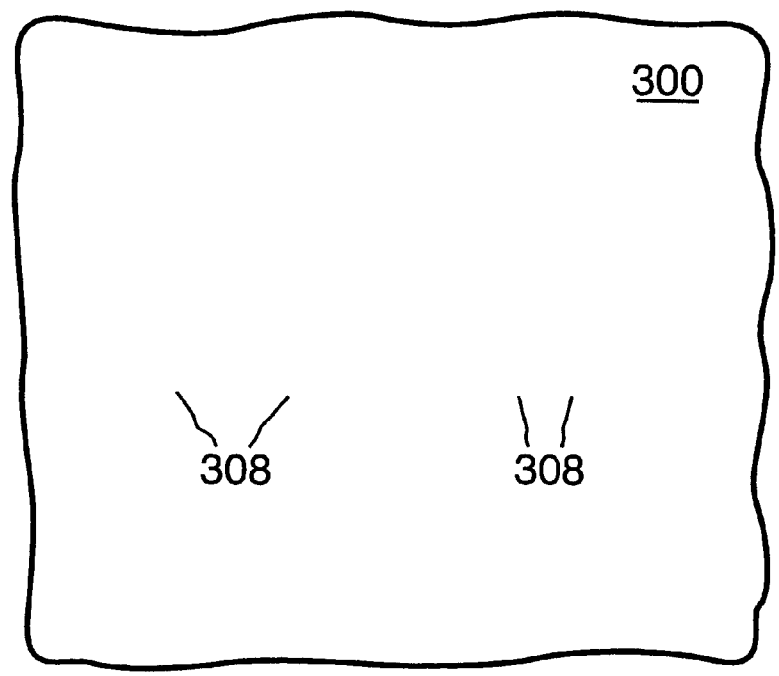

It has been observed that several defects, including wet-out and Newton's rings, occur when the adjacent surfaces of different films are smooth and flat. An approach to reducing such defects is to make the height of at least one of the film surfaces vary in a random fashion. This is illustrated, for example, in FIG. 3A where a multi-film display 300 has two files 302 and 304. The upper film 302 has upper and lower surfaces 306 and 308.

The lower film 304 has an upper surface 310 which has a randomly varying height across the plane of the film 304. The surface 310 has certain local maxima 312 that are sufficiently high as to contact the upper film 302. There may also be other local maxima 314 that are not sufficiently high to contact the film 302.

The random nature of the height prevents the formation of wet-out regions like those illustrated in FIG. 1. The lower film 304 contacts the upper film 302 only at a number of very small points invisible to the viewer, rather than over a large area as happens with wet-out. In addition, the appearance of Newton's rings may be reduced by the surface with random height variations where the local maxima are spaced sufficiently close to one another that a Newton's ring pattern is too small to be perceived by the viewer. For example, consider a surface where adjacent local maxima are separated by an average distance of approximately 200 microns. A change in the separation distance between two film surfaces of around 1.5 microns is a distance of approximately three wavelengths, which is the equivalent of six fringes. Therefore, there are six fringes in, on average, a distance of 100 microns (half the inter-maximum separation) from the local maximum. The resultant feature size is around 16 $\mu$m, which is too small to be perceived by the viewer.

The random variation in the height of the film surface produces a number of other unexpected and favorable results, in addition to the reduction of wet-out and Newton's rings. First, films fabricated according to the present invention do not have the appearance of high performance, transparent optical films. Instead, they have deceptive, almost hazy, appearance that may mask some of the small defects in any structure on the film. This can considerably improve the yield of the manufacturing process. Second, films of the invention may also help to eliminate or hide Moiré patterns that result from interference between structures on different films in the display. Another important result is that the optical effects of different films in a multi-layer display, such as brightness enhancing, diffusion, or collimation, may be essentially unaffected where the surface of one or more of the films in the film stack has randomized heights.

For the purposes of this description, a surface having portions of randomized height is referred to as an "anti-wet-out surface", although it is understood that such a surface does more than reduce wet-out, for example reducing Newton's rings. The anti-wet-out surface is substantially flat on a large scale typically perceivable by a viewer. On a smaller scale, typically not perceivable by a viewer, there are many peaks, or local surface height maxima, on the surface. The average difference in height between these local surface height maxima and intervening local surface height minima is typically small, of the order of one or two microns. Consequently, if the anti-wet-out surface is placed against another smooth surface, the vast majority of the area on the anti-wet-out surface is held out of contact with the second surface, at a distance of a few microns or less. The peaks contact the second surface, and the area of each point of contact is sufficiently small to avoid any perceptible wet-out at any one peak. The peaks may be irregularly spaced, with an average separation, for example, in the range 50 $\mu$m to 500 $\mu$m, and preferably in the range 100 $\mu$m to 250 $\mu$m. The peaks may have different heights, within a specific range, with an average difference in height between the local maxima and the local minima less than about 5 $\mu$m, and preferably less than about 2 $\mu$m. The average separation in height between the local minima and maxima may be approximately 1.5 $\mu$m.

There may be, therefore, an irregularity, or degree of randomness, in the separation between the peaks. There may also be another degree of randomness in the height of the peaks. There is not true randomness in the peak separation or peak height, however. The values of peak height and/or the peak separation may each take on a value, randomly, or pseudo-randomly, that lies within a preselected range. By placing upper and lower bounds on the peak separation and/or the peak height, certain types of defects arising from extreme, but statistically possible, peak separations or peak heights may be reduced.

Another characteristic of the anti-wet-out surface that may be permitted to vary in a random fashion, within limits, is the slope angle of the surface leading up to a local maximum. Where the slope angle is high, light passing through that portion of the surface having the high slope angle is refracted at a larger angle to the film normal than light passing through a portion of the surface whose slope angle is small. This may affect the dispersion qualities of the film, so that a film having a surface with a higher slope angle disperses light through a greater angle. Furthermore, the slope of a peak on an anti-wet-out surface need not be symmetrical around that peak, but may, for example, have a large slope, and therefore large dispersion, relative to a first axis, and a small slope, and therefore little dispersion, relative to a second axis orthogonal to the first axis. The slope of the surface in a given direction on the film surface may be random within prescribed limits.

Films fabricated according to the present invention may be made of any substantially transparent material. Bulk diff-using material may be incorporated in a film according to the invention, although in many cases this may degrade the performance of the optical film. In addition, multiple layers of film and material may be included in a single film in order to produce a specific optical effect, such as reflection polarization. Unitary, extruded films of acrylics and polycarbonates are good candidates for film materials. Also, the film may be a two-part construction where the structured surface is cast and cured on a substrate having the smooth, randomized height surface according to the present invention. For example, ultraviolet-cured acrylics cast on polyester substrates may be used. Films of polyethylene terphthalate ("PET") have been shown to work well as substrates on which structures may be cured. By axially oriented PET is often preferred for its mechanical and optical properties. A polyester film that may be used as a substrate is commercially available from duPont ICI America's Inc., Hopewell, Va. under the trade name MELINEX™ 617. Polyethylene naphthalate (PEN) has also been shown to work well as a polymeric material for manufacturing optical films, both alone and as a co-polymer with PET (known as CoPEN).

Figure 4A:
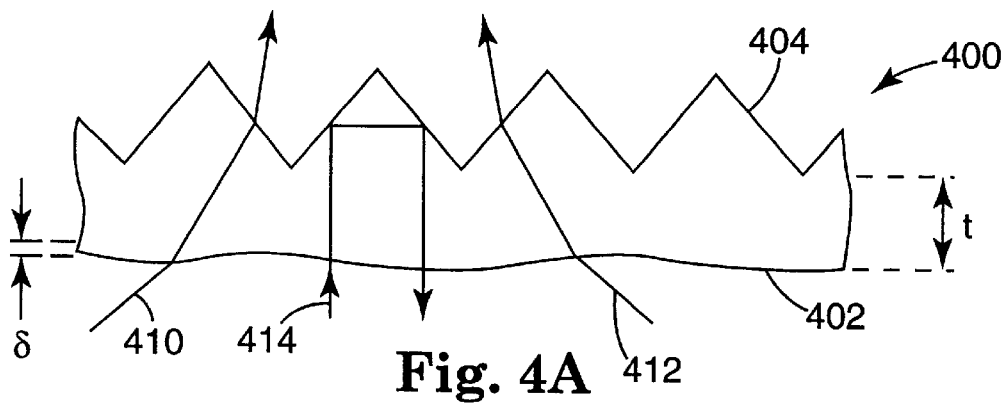
FIGS. 4A–4 illustrate surface-structured films with wet-out reducing surfaces according to the present invention.
Figure 4B:
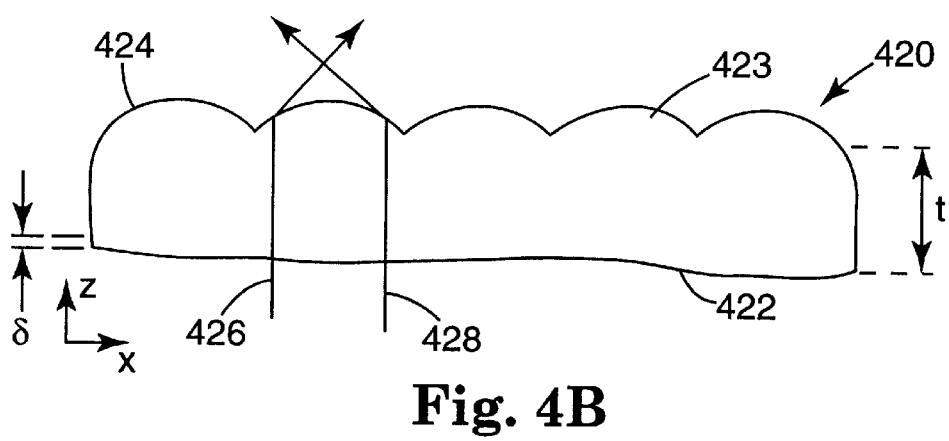
FIG. 4D illustrates a flat film having a wet-out-reducing surface according to the present invention.
Figure 4C:
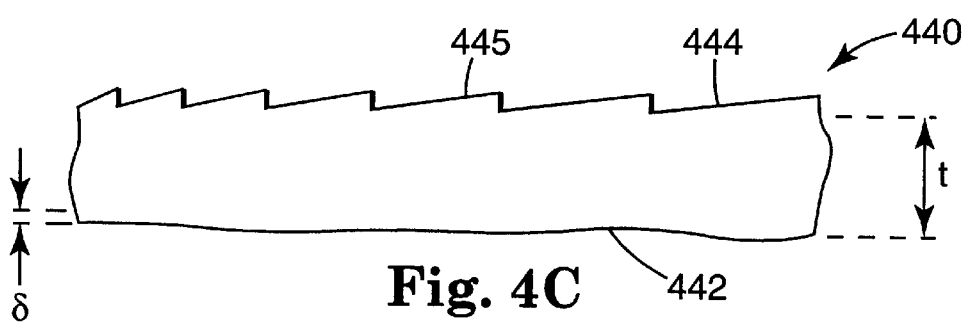
Figure 4D:
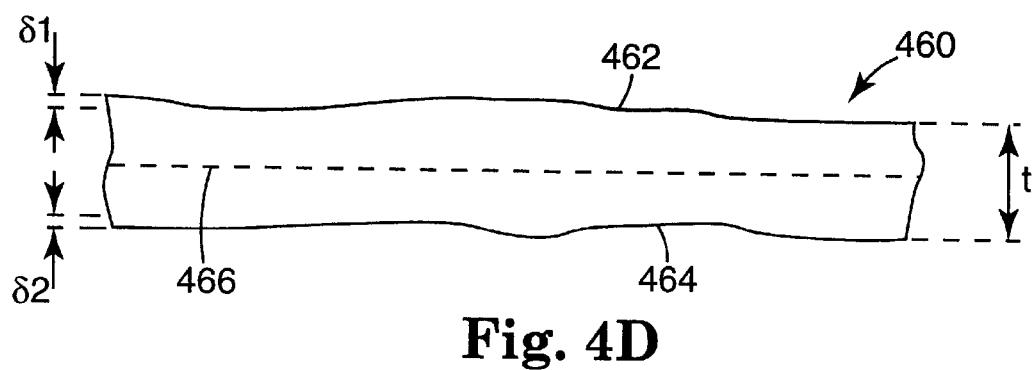

An anti-wet-out surface may be provided on many different kinds of optical films. A prismatic brightness enhancement film 400, for example such as is described in U.S. Pat. No. 5,056,892, may be provided with a lower surface 402 that is an anti-wet-out surface, as illustrated in FIG. 4A. It should be noted that the drawing, like the following drawings in FIGS. 4B–4D, is not drawn to scale.

The brightness enhancing film 400 has a series of prismatic structures 404 disposed parallel on one surface, which is referred to as a structured surface. The prismatic structures 404 enhance the brightness of the image viewed through the display by the viewer. Light, for example rays 410 or 412, pass into the brightness enhancing film 400 through the lower surface 402. The light rays are directed towards the normal to the film surface on exiting from the film 400, and so light that would otherwise have been transmitted at a larger angle to the film normal, is directed towards the film normal and hence the display appears brighter to a viewer. Some light, for example, ray 414, is totally internally reflected by a prismatic structure 404 and it is returned to the light source. If the light source is contained within a suitably reflecting enclosure, the reflected light ray 414 is recycled for propagation through the brightness enhancing film 400.

The film 400 typically has a thickness, t, that lies in the range of 100 $\mu$m to 250 $\mu$m. The variation in height, $\delta$, between the local maxima and local minima on the anti-wet-out surface 402 is typically in the range 0 $\mu$m to 5 $\mu$m, and is preferably in the range 0 $\mu$m to 2 $\mu$m. Most preferably, the value of $\delta$ is approximately 1.5 $\mu$m. At this value, color separation reduces the visibility of the Newton's rings. The heights of the peaks, the local maxima, may also be described in terms of difference between an actual height and a nominal height. For example, the peaks may have actual heights that range by up to 5 $\mu$m in difference from the nominal height. Preferably, the difference between actual heights and nominal heights is less than 1.5 $\mu$m. The average separation between local maxima is typically in the range from 20 $\mu$m to 400 $\mu$m, and is preferably in the range from 100 $\mu$m to 250 $\mu$m.

As indicated above, the size of the Newton's ring pattern is dependent on the average separation between local maxima. The larger the separation becomes, the greater the probability that the Newton's ring pattern will become visible. Therefore, it is advantageous to reduce the average inter-maximum separation. On the other hand, where the average height of the local maxima is constant, a reduction in the average inter-maximum separation results in a larger surface slope angle. A larger surface slope angle produces greater diffusion of the light passing through the film surface. While a degree of surface diffusion may be acceptable in some applications, there are other applications where surface diffusion should be minimized.

Accordingly, a value of δ of approximately 1.5 μm, and an average separation between local maxima in the range 150 μm and 250 μm may be used to reduce wet-out and Newton's rings problems, while also reducing surface diffusion. These values are provided only as suggested operating points and are not intended to limit the invention.

Another advantage of the invention is the ability to preferentially orient the anti-wet-out surface relative to a structure on the other side of the film. For example, the anti-wet-out surface 402 may be selected to have a surface slope that is small in a direction perpendicular to the prisms of the prismatic structure 404 while, at the same time, having a larger slope on the surface 402 in a direction parallel to the prisms. Such an arrangement may advantageously diffuse light in a direction parallel to the prismatic structures, without increasing the diffusion of light in a direction across the prismatic structures.

Another example of a structured film that may use an anti-wet-out surface is illustrated in FIG. 4B. The film 420 has a lenticular pattern 423 on an upper surface 424. The lenticular pattern 423 may be used, for example, for diffusing light in one dimension, in a direction at right angles to the grooves of the lenticular pattern 423. For example, light rays 426 and 428 are refracted in a direction within the plane of the figure upon exiting the lenticular surface 424. Therefore, the light that passes through this film 420 is distributed in the x-direction. The lower surface 422 is an anti-wet-out surface provided to reduce optical defects. The lenticular film 420 may have an average thickness, t, that typically lies in the range from 100 μm to 500 μm.

Another type of structured film that may have an anti-wet-out surface is illustrated in FIG. 4C. The film 440 is a Fresnel lens, having a Fresnel structure 444 on the upper surface 445. The lower surface 442 is an anti-wet-out surface.

It will be appreciated that an anti-wet-out surface may be used in other structured films than those illustrated in FIGS. 4A to 4C. For example, other structures may be present on the structured surface of the film, such as lenses, or other light refracting or diffracting structures.

In addition, an anti-wet-out surface may be used on a film that has essentially no surface structure, such as a polarizer, bulk diffuser, scattering film, retardation film or the like. The optical effect of such films is typically based on an optical interaction that takes place within the bulk of the film, rather than relying on a refractive effect at a structured surface. A polarizing film 460 is illustrated in FIG. 4D, where the lower surface 464 is an anti-wet-out surface. It will be appreciated that a film having no refracting structure may have an anti-wet-out surface on each surface 462 and 464.

The film 460 is illustrated having an imaginary plane 466 passing through the center of the film 460, substantially parallel to the surfaces 462 and 464. Each surface 462 and 464 is shown with an overall variation in height from the plane 466 that is within respective ranges δ1 and δ2. Typically, δ1 and δ2 are within the range 0 μm to 5 μm, and more typically are approximately 1.5 μm.

It will be appreciated, therefore, that the provision of anti-wet-out features to otherwise smooth film surface may be used for the reduction of defects in displays. This is applicable to many different types of films. Such films may include refractive structure on a surface, or may be based on a bulk optical interaction effects that depend on the propagation of light through the film. The films with the anti-wet-out surface may also be based on a combination of bulk and surface effects.

Figure 5A:
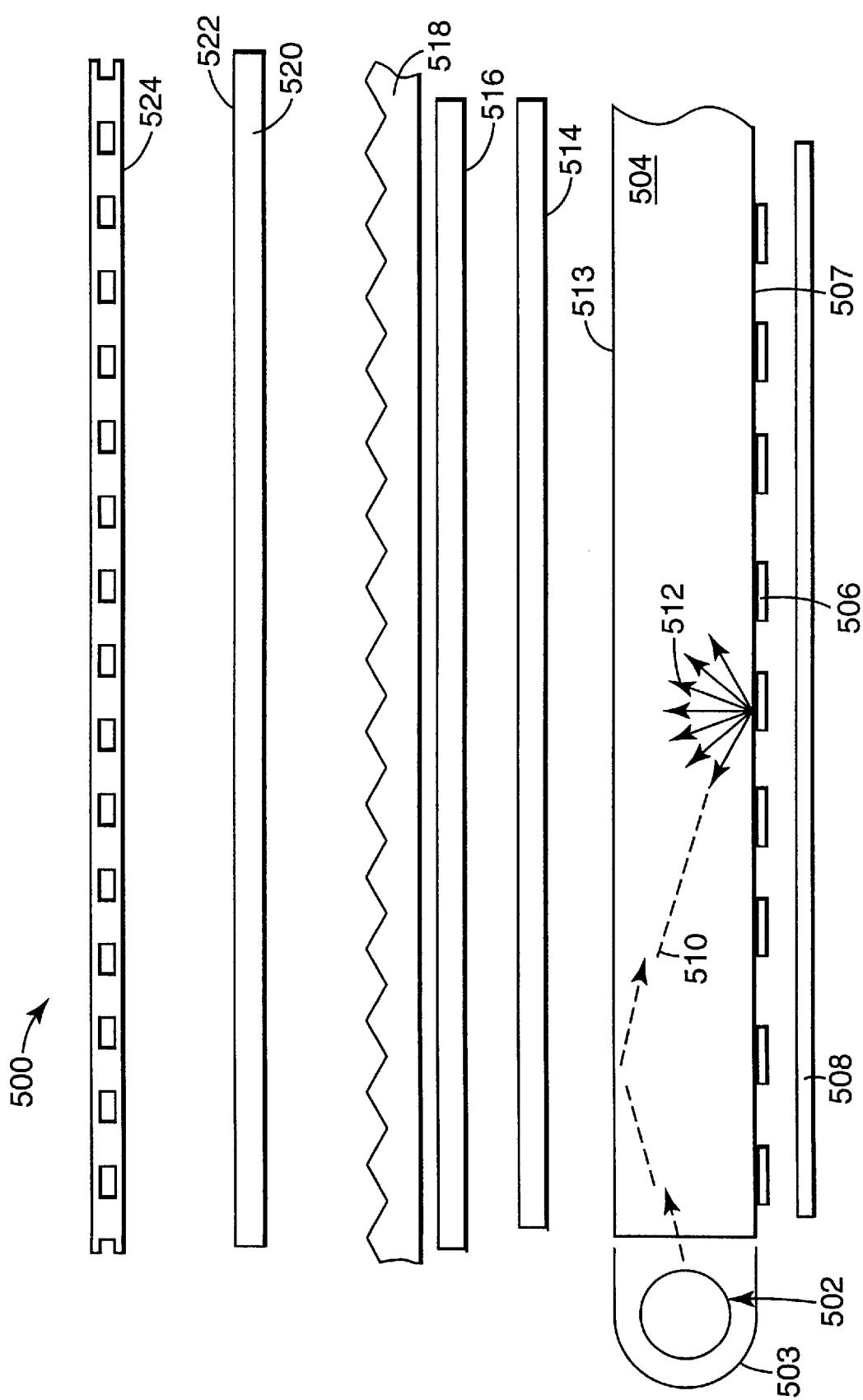
FIGS. 5A and 5B illustrate embodiments of illumination devices incorporating a film having a wet-out-reducing surface according to the present invention.

One particular example of an apparatus using a film having an anti-wet-out surface is illustrated in an exploded view in FIG. 5A. A liquid crystal display (LCD) illumination module 500 uses a fluorescent lamp 502 and reflector 503 as a light source to direct light into a light guide 504. The light guide is provided with diffusely reflecting extraction dots 506 on the lower surface 507. A broadband, diffuse reflector 508 is positioned below the light guide 504 to reflect any light recirculated from any components above the guide 504. Light from the fluorescent lamp 502 enters the side of the light guide 504 and is guided along the light guide 504 via internal reflection at the surfaces of the guide 504. A light ray 510 incident on one of the extraction dots 506 is diffusely reflected to produce a number of diffusive rays 512.

Light propagating upwards from the extraction dots 506 passes through the upper surface 513 of the guide 504. A diffuser 514 may be positioned above the light guide to further diffuse light extracted from the guide 504, and thus make the subsequent illumination of an LCD display 524 more uniform.

Light continuing in an upwards direction may then pass through a lower brightness enhancement film (BEF) 516, having a prismatic structure on an upper surface similar to the prismatic structure illustrated for the brightness enhancing film in FIG. 4A. The lower BEF 516 reduces the divergence of light along one dimension (for example, out of the plane of the figure). An upper BEF 518, placed above the lower BEF 516, has its prismatic structure oriented at about 90° relative to the prismatic structure of the lower BEF 516 to reduce divergence of the light along a second dimension (for example, in the plane of the figure). Light reflected by either the upper or lower BEF 518 and 516 may be recirculated by the reflector 508. The pair of crossed BEF films 516 and 518 may be effective in reducing the overall divergence of light extracted from the light guide 504.

A reflective polarizing film 520 is positioned above the upper BEF 518. A reflective polarizer transmits light of one polarization and reflects light of an orthogonal polarization. Therefore, the light passing through the polarizing film 520 is polarized. The light reflected by the polarizing film 520 may be recirculated by the reflector 508. The polarizing film 520 is provided with an anti-wet-out upper surface 522.

An LCD matrix 524 is positioned above the polarizing film 520. Polarized light passing through the LCD matrix is spatially modulated with information, for example an image, which is then transmitted. The anti-wet-out surface 522 reduces the formation of wet-out and Newton's rings between the polarizing film 520 and the LCD matrix 524, thus enhancing the quality of the image seen by the viewer. The use of an anti-wet-out surface 522 avoids the need to include a wet-out-reducing cover sheet between the polarizing film 520 and the LCD matrix 524.

Other components may be included in the module 500, such as a cover sheet between the upper BEF 518 and the polarizing film 520.

Figure 5B:
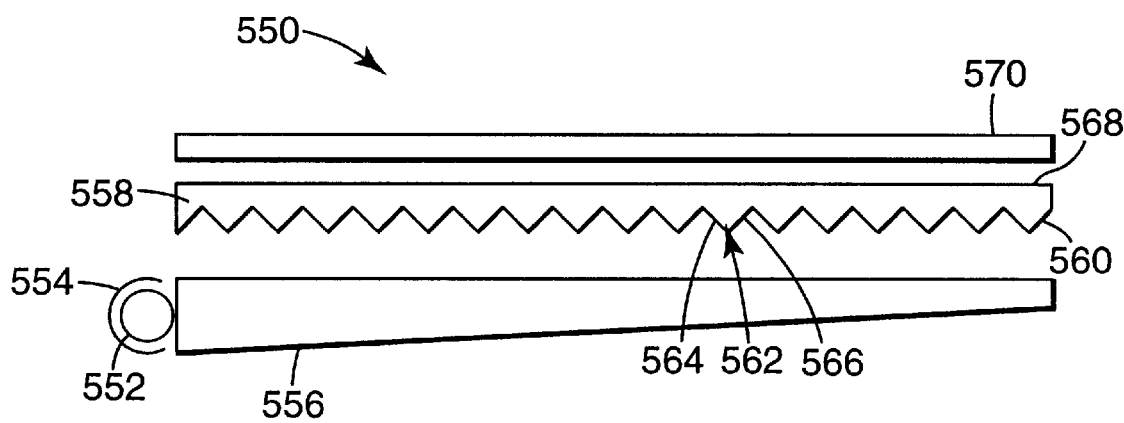

FIG. 5B shows another type of display 550, that uses a light redirecting film according to the present invention. Light from a lighting element 552 is directed by a reflector 554 into a light guide 556. The lighting element 552 is typically a fluorescent tube, although other types of elements may be used. The light guide 556 is wedged, but other shapes, such as a pseudo-wedge could be used. The light guide 556 may be transparent or may include a bulk diffuser.

Figure 5C:
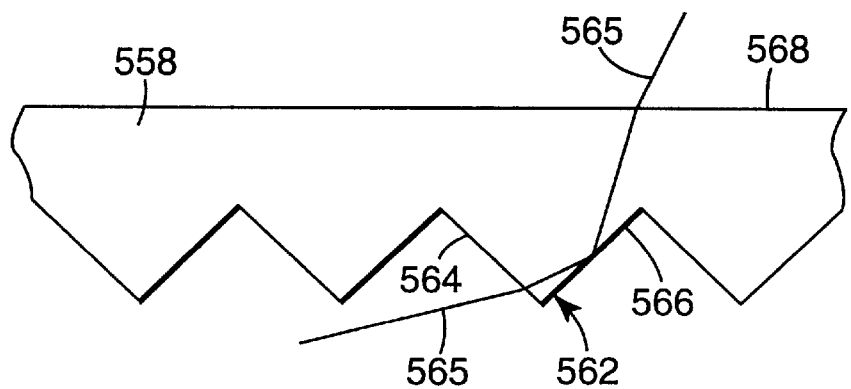
FIG. 5C illustrates light passing through the light redirecting film of the illumination device shown in FIG. 5B.

Light emerging from the light guide 556 at a low or grazing angle enters the light redirecting film 558. The light redirecting film 558 has a structured surface side 560 having a plurality of linear prisms such as linear prisms 562. A linear prism 562 has a first side 564 and a second side 566. Light from the light guide 556 typically enters the redirecting film 558 through the first sides 564 of the linear prisms 562 and is totally internally reflected by the second sides 564, as shown for light ray 565 in FIG. 5C. After total internal reflection, the light emerges from the redirecting film 558 through the output surface 568. The light may then pass through a light gating device 570, such as a liquid crystal display. The output surface 568 of the redirecting film 568 may be an anti-wet-out surface to prevent optical defects from occurring between the redirecting film 568 and the light gating device 570.

It will be appreciated that the description of modules 500 and 550 is given only for illustrative purposes and is not intended to limit the use of a film having an anti-wet-out surface in any way. A film with an anti-wet-out surface may be employed in many different types of optical system where two optical surfaces may otherwise contact one another and produce wet-out or Newton's rings.

Figure 6:
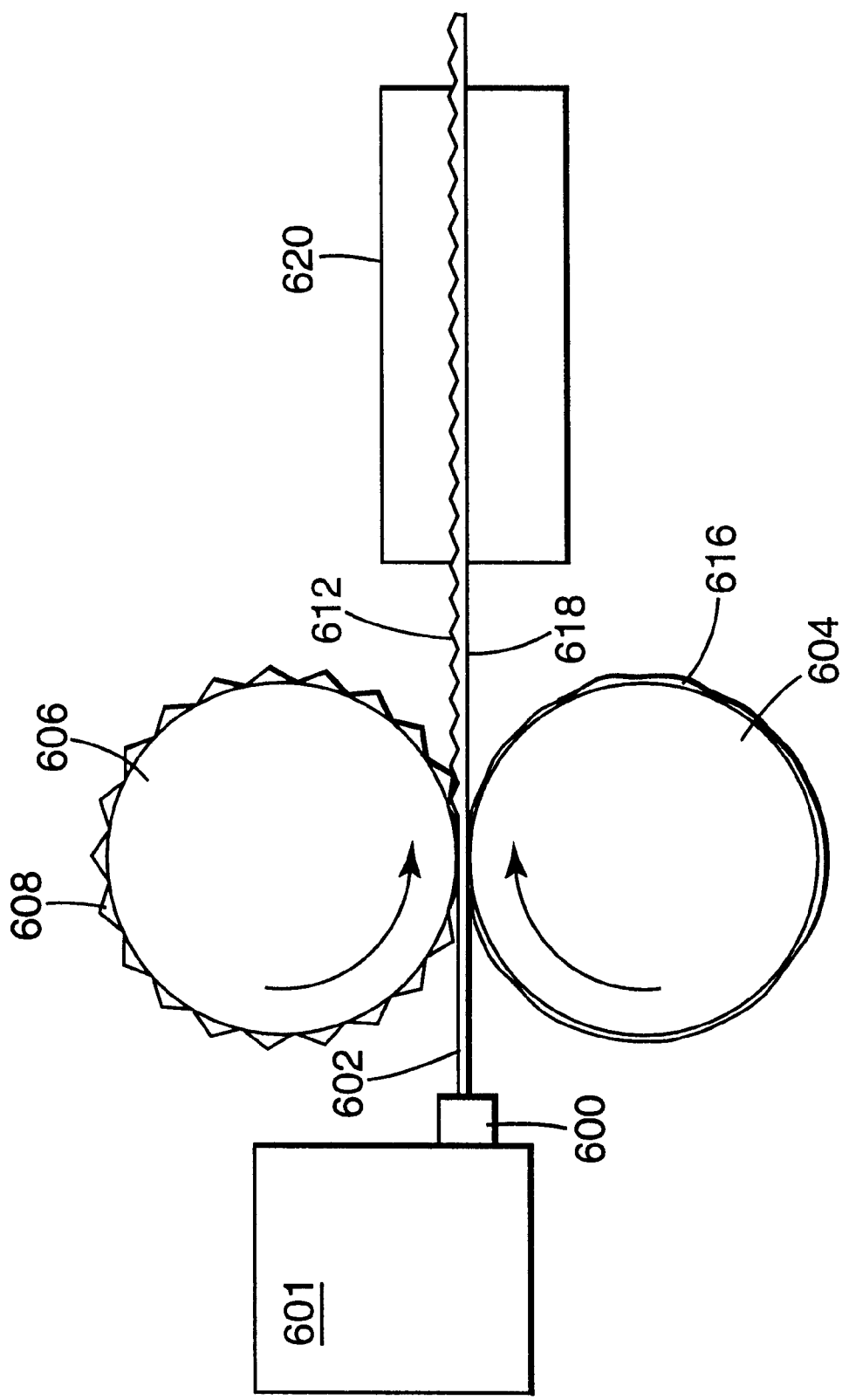
FIG. 6 schematically illustrates one process for fabricating films according to the present invention.

Optical films are commonly manufactured by various different methods, including embossing, extrusion, casting and curing, compression molding and injection molding. These methods are suitable for forming an anti-wet-out surface on the film. For example, a film may be cast between a pair of rollers that are spaced apart by a specific dimension, as is illustrated in FIG. 6, where a film 602 is pulled from a reservoir 601, through a die 600 by an extrusion roller 604. The film 602 is nipped between the extrusion roller 604 and a second roller 606. Where the film 602 has a surface structure, the second roller 606 may be a pattern roller, provided with a prescribed surface for embossing a pattern onto the film 602. For example, where the film 602 is being manufactured as a brightness enhancement film, as illustrated in FIG. 4A, the second roller 606 is provided with a plurality of prismatic structures 608 around its surface, which create complementary impressions in the upper surface 612 of the film 602. The pattern roller may have a diameter whose value lies in the range 15 cm–60 cm. The extrusion roller 604 may also be provided with an embossing pattern that is used to emboss a pattern onto the lower surface 618 of the film. After passing between the rollers 604 and 606, the film 602 cools, for example in a cooler 620, and maintains the patterns embossed on it by the rollers 604 and 606. In the particular embodiment shown, the extrusion roller 604 has a surface 616 that has random variations in height, for embossing an anti-wet-out surface on the lower surface of the film 618.

The upper roller 606 may be provided with many different types of embossing patterns. Examples of embossing patterns that may be used on the upper roller 606 include a prismatic pattern for a brightness enhancement film, a lenticular pattern for a lenticular film, and a Fresnel pattern for a Fresnel lens. In addition, the prismatic structures on the upper roller 606 may be arranged in a direction perpendicular to the direction of rotation, around the circumference of the roller 606, rather than in a direction parallel to the direction of rotation, as shown in FIG. 6. The upper roller 606 may also be smooth to provide a flat film surface, or may be provided with a surface for embossing an anti-wet-out pattern on the upper surface 612 of the film 602. The surface of the extrusion roller 604 may include an irregular embossing pattern to produce an anti-wet-out surface, although this is not a requirement. Where both rollers 604 and 606 have an irregular embossing pattern, the resulting film has two anti-wet-out surfaces.

Other approaches may be followed to producing a film having one or more anti-wet-out surfaces, including embossing a sheet, injection molding and a compression molding. In one particular approach, a film of embossable material, applied to a web, is compressively held against a pattern surface to emboss the complement of the pattern surface onto the film. The embossable material may be a thermoplastic material, and so the film may be film may be cooled while being held against the pattern surface in order to solidify the material with the pattern embossed thereon. In a variation of this approach, the embossable material may be a curable polymer that is cured, or partially cured, in place against the pattern surface or after the pattern surface is removed.

In another approach to forming an anti-wet-out surface, the film may be injection molded using a mold having an irregular pattern thereon. The resulting injection molded film has an anti-wet-out surface that is the complement of the irregular pattern in the mold. In another approach, the film may be compression molded. The molding tool may be provided with an irregular surface that forms the anti-wet-out surface on the molded part.

After a film has been embossed, it may undergo additional post processing procedures, such as coating, for example to produce an anti-reflection coating, or the like.

The film may also be stretched after fabrication, using one or more of a number of different methods. For example, one possible method is length orientation, where the web is nipped between two sets of rollers and the downstream set of rollers rotates faster than the upstream set. Another method is tentering, which involves gripping the edges of a film with, for example, continuous clamps arranged in a conveyor belt-like manner on either side of the web. As the clamps move forward, the continuous clamps move apart, stretching the film in between over a prescribed distance. Tentering is typically performed so as to stretch the film only in one direction, e.g. across the web, while not stretching in the down-web direction. The web is typically stretched to an extent sufficient to achieve a desired thickness or a desired molecular orientation in the film. The width of a film may be increased by a factor in the range 2–10 times in the tentering process, more typically by a factor in the range 3–8 times. A film may also be stretched as a sheet, rather than as a web, in a stretching frame where the edges of the sheet are attached to the sides of a frame, and the sides of the frame pulled apart.

Since the volume of the film material remains essentially constant when stretching, the cross-sectional shape of the film changes in a reasonably well-defined manner. Where the film is laterally stretched by a factor of X times, the height of the film reduces by a factor of X, since the cross-sectional area remains the same. Therefore, if an unstretched film has an anti-wet-out pattern embossed on one surface, and the average difference in height between local maxima and local minima is Y, then the average difference in height between local maxima and minima for the stretched film is approximately Y/X. For example, if an unstretched film has an anti-wet-out surface with average difference in height between local maxima and minima of 8 $\mu$m, and the film is stretched by a factor of 4, then the average height difference between local maxima and minima is approximately 2 $\mu$m after the film is stretched.

Therefore, the anti-wet-out surface is formed on the film having dimensions, e.g. average peak height, average peak separation, that are selected depending on whether or not the film is to be stretched. If no stretching takes place, then the surface formed on the film has the desired peak height and average separation. However, if the film is to be stretched, say in one dimension, then the peak height formed on the surface is X times the desired final peak height, where X is the stretching factor. Additionally, the average peak separation in the stretching direction formed on the film surface is 1/X times the desired final peak separation in the stretching direction. If stretching takes place in one dimension only, then the average peak separation in the direction orthogonal to the stretching direction does not change. Therefore, the average peak separation in the orthogonal direction is formed on the film to have the same value as the desired value after stretching. This is further explained in the description of the example presented below.

Where the film is stretched in two dimensions, e.g. across and along the web, the dimensions of the surface formed on the film are selected so that the dimensions on the anti-wet-out surface after stretching are within the desired limits.

Masters for the tools used for manufacturing structured films, such as prismatic films, lenticular films and films having Fresnel lenses, may be made by diamond turning techniques. These masters may be used for manufacturing a film by an extrusion or by a cast and cure process. Typically, the tools for linear patterns are made by diamond turning on a cylindrical blank known as a roll. The surface of the roll is typically of hard copper, although other materials may also be used. The structures are formed in continuous patterns around the circumference of the roll. In one specific embodiment, the structures may be machined by a technique known as thread cutting, in which a single, continuous cut is made on the roll while the diamond tool is moved in a direction transverse to the turning roll. If the structures to be produced have a constant pitch, then the tool moves at a constant velocity along the roll. A typical diamond turning machine may provide independent control of the depth that the tool penetrates into the roll, the horizontal and vertical angles that the tool makes to the roll and to the transverse velocity of the tool. Additionally, the diamond turning machine may control the rotational speed of the roll. Similar techniques may be adapted for manufacturing an anti-wet-out embossing roll.

Figure 7:
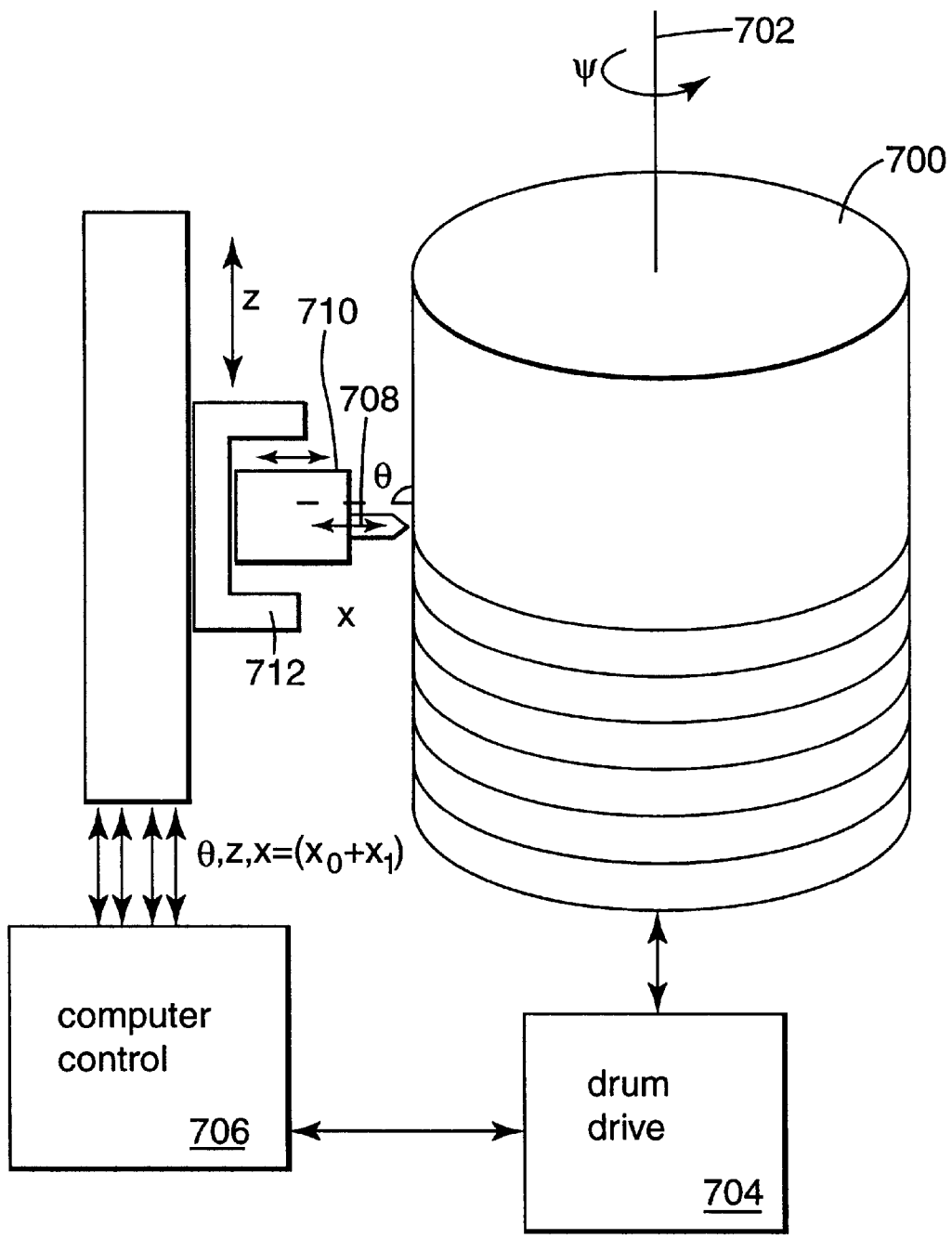
FIG. 7 schematically illustrates a first method of fabricating a drum for manufacturing films according to the present invention.

A method for manufacturing the roll for embossing an anti-wet-out surface is illustrated in FIG. 7. A drum 700 is rotated around an axis 702 by a drum drive 704. A computer 706 controls the drum drive 704 and may also monitor the current angular position, ψ, of the drum 700. The controlling computer 706 also controls the movement and operation of a diamond cutting tool 708. The computer 706 directs control signals to the cutting tool holder for movement in the z-direction, parallel with the axis 702, the x direction which is radially directed towards the axis 702, and may also direct control signals for the angle, Π, between the tool 708 and the surface of the drum 700. The size and shape of the cutting tool are selected depending on the particular type of film for which the roll 700 is to be used for manufacturing.

Typically, the computer 706 drives the cutting tool in the z-direction to move the tool 708 along the rotating drum 700. Control of the cutting tool 708 in the x-direction controls the depth of cut into the surface of the drum 700. The diamond cutting tool 708 may be held in a fast servo unit 710 which is attached to a mount 712. The mount 712 is typically translatable in the x and z directions under control from the computer 706. The fast servo unit 710 also translates the cutting tool 708 in the x-direction. However, the cutting tool 708 operates at frequencies not normally obtainable with regular machine tool mounts. The upper frequency limit of the fast servo unit's response may lie in the range from kilohertz to tens of kilohertz, whereas the frequency response of a regular machine mount is typically not greater than 5 Hz. The length of the stroke that the fast servo unit 710 produces in the x-direction is typically short, less than 50 μm, and may be less than 20 μm. It will be appreciated that there may be a trade-off between length of stroke and upper frequency response. In general, the fast servo unit 710 is used to produce short, fast excursions of the cutting tool 708 in the x-direction, while the mount 712 is used to produce longer, but slower excursions of the cutting tool 708 in the x-direction. An anti-wet-out surface pattern is cut on the drum by thread cutting a shallow groove on the drum, i.e. translating the cutting tool 708 in the z-direction while cutting into the surface of the drum 700. The mount 712 may be a second servo unit operating in a lower frequency band than the fast servo unit 710.

Several different approaches may be employed for controlling the surface cut on the drum 700. In one approach, illustrated in FIG. 7, the computer 706 generates control signals for z and, optionally, θ. The computer 706 also generates a control signal x for the cutting tool 708 that has two components. The first component, $x_0$, is a slowly varying function that is directed to the mount 712 to translate the fast servo unit 710 in the x-direction. The slowly varying function may be, for example, sinusoidal or random. The second component, $x_1$ is a computer-generated noise function, that controls the fast servo unit 708 to make small, rapid, independent, randomly-timed movements in the x-direction.

The resulting random cut on the surface of the roll 700 has an average spacing between local minima around the roll circumference that is dependent on the surface speed of the roll relative to the cutter 708, and the average period of time between randomly timed excursions of the cutting tool 708 in the x-direction. Because the surface of the drum 700 forms the complementary surface on the film, local minima on the roll surface correspond to local maxima on the film surface. Where the average separation between local minima in the height of the roll surface is selected to be approximately 150 μm, and the average time between excursions of the roll 708 is 200 μs (corresponding to an average cutting tool operation frequency of 5 kHz), the surface speed of the roll is selected to be approximately 0.75 ms$^{-1}$.

In addition to varying the x-position of the cutting tool 708 by a fast-x translation by the fast servo unit 710, the x-position of the cutting tool 708 may be varied by a slow-x translation of the mount 712, under the control of the $x_0$ signal component. Where the $x_0$ signal is varied at a rate that is not an harmonic or subharmonic of the rotation rate of the roll 700, the appearance of a regularity in the periodicity of the cut surface may be avoided. The slow-x translation of the mount 712 may be used to vary the height of the surface cut into the roll 700 by an amount greater than the stroke length of the fast servo unit 710.

Figure 8A:
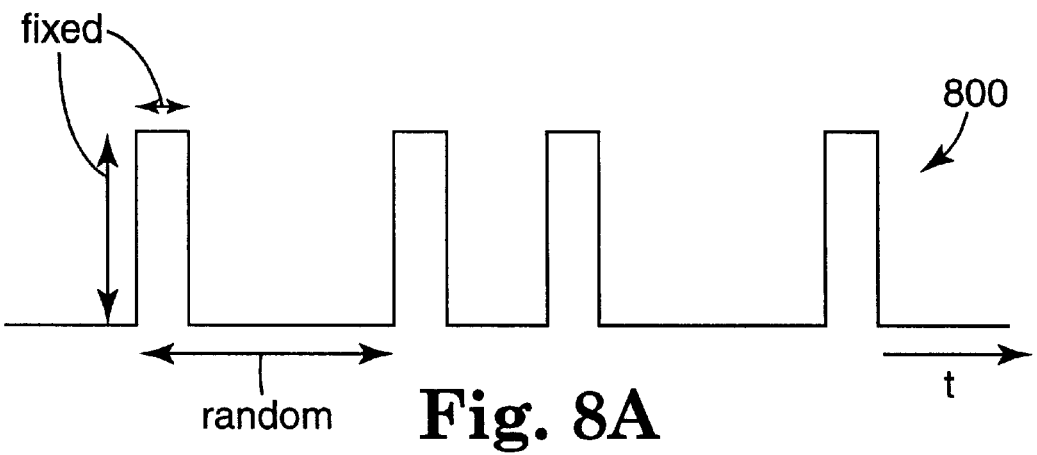
FIG. 8 illustrates some random control signals for controlling a cutting tool according to the present invention.
Figure 8B:
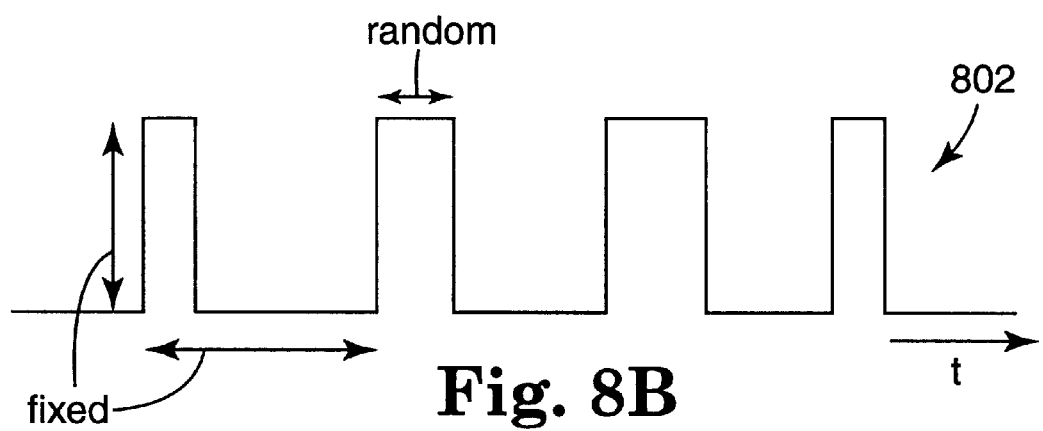
Figure 8C:
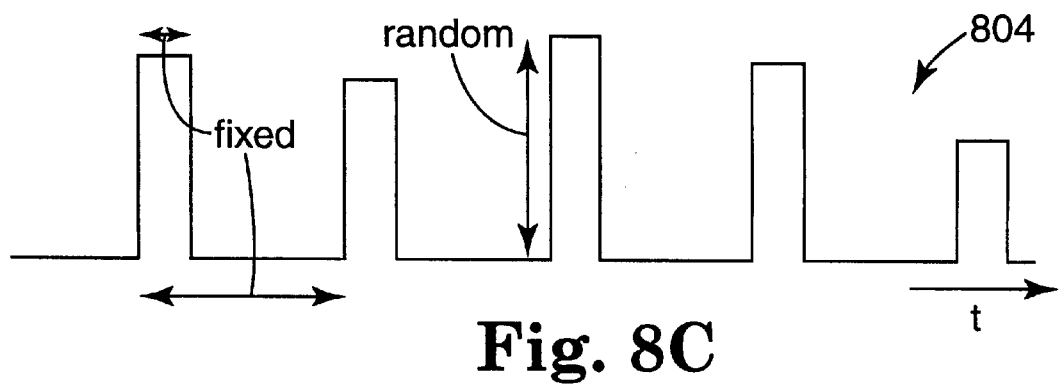

FIGS. 8A–8C illustrate examples of different types of control signal, as a function of voltage plotted against time, that the computer 706 may transmit to the fast servo unit 710 for cutting a random, or pseudo random, pattern on the surface of the roll 700.

In FIG. 8A, the control signal 800 includes a series of pulses of fixed amplitude and width, with randomly varying inter-pulse separation. In FIG. 8B, the control signal 802 includes a series of pulses having fixed amplitude and separation, but randomly varying width. In FIG. 8C, the control signal 804 includes a series of pulses having fixed width and separation, but randomly varying amplitude.

The pattern of randomly appearing pulses appearing in the signals 800, 802 and 804 are translated by the fast servo unit 710 to respectively equivalent patterns on randomly distributed minima cut onto the surface of the roll 700. The series of pulses in the control signal supplied to the fast servo unit 710 may include any combination of randomly varying pulse amplitude, pulse width and inter-pulse separation. An advantage of supplying a randomly, or pseudo randomly, varying control signal to the fast servo unit 710 from the computer 706 is that a randomly generated pattern cut onto one roll may be programmed into the computer 706 and repeated on another roll.

Amongst other advantages of the pulsed control signal, the heat generated in the fast servo unit 710 may be reduced, it may be easier to increase roll cutting speed and it may be easier for the designer to understand and model the cutting process.

Other types of signals may be transmitted to the fast servo unit 710 to provide the appropriate translation of the cutting tool 708 to cut the roll 700, and the presentation of the examples in FIGS. 8A–8C is not intended to limit the invention.

It was mentioned above that an advantage of the invention is the ability to select a characteristic of the anti-wet-out surface to be a specific value relative to a certain direction, for example the surface slope in a direction parallel to the direction of the prisms on a prismatic film. In another example of orienting an anti-wet-out surface, it may be possible to select a range of "down-thread" separation between surface minima while cutting a drum, for example between 150 $\mu$m and 200 $\mu$m, while not imposing any particular restraint on the "across-thread" separation between local minima. Such orientation selection of a random characteristic may be useful, for example, for avoiding linear effects, such as a linear Moire-pattern.

Figure 9:
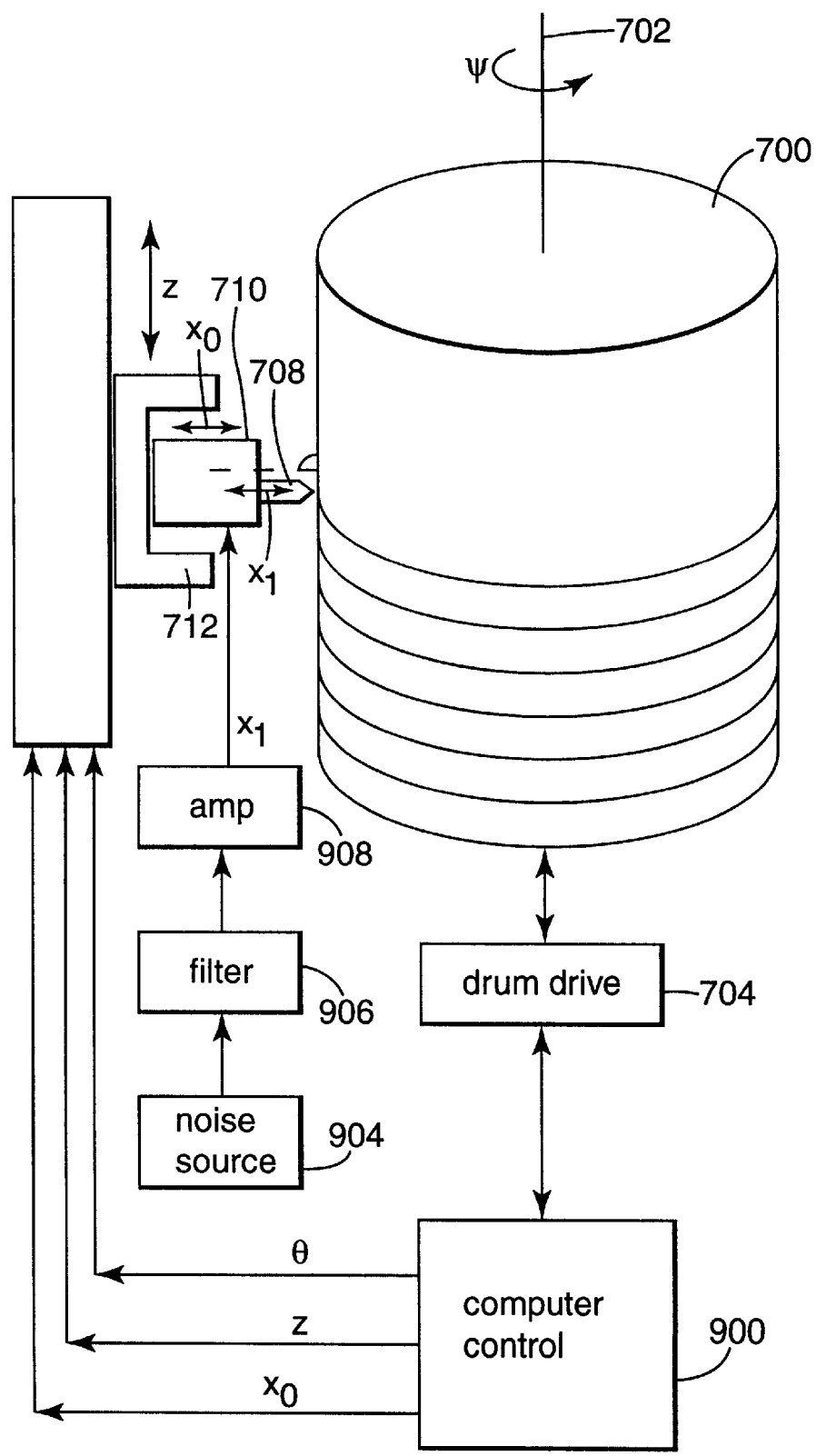
FIG. 9 schematically illustrates a second method of fabricating a drum for manufacturing films according to the present invention.

Another approach to cutting an anti-wet-out surface onto a drum is illustrated in FIG. 9. Components that are similar to the components of FIG. 7 have similar identifying numbers. The computer 900 that controls the cutting operation is connected to the drum drive 704 to control and monitor the angle, $\psi$, of the drum 700 as it rotates around the axis 702. The computer 900 transmits a control signal to the mount 712 for controlling motion of the cutting tool 708 in the y direction and a slow-x signal for relatively slow motion of the cutting tool 708 in the x-direction. The computer 900 may also provide control signals to control the angle, $\theta$, between the cutting tool 708 and the surface of the roll 700.

A noise source 904 generates a noise signal, $I_n$, that typically passes through a bandpass filter 906. The filtered noise signal is amplified, if necessary, in an amplifier 907, and applied to the fast servo unit 710 as a fast-x signal to produce irregular, fast motion of the cutting tool 708 in the x-direction.

The pass band of the filter 906 may be adjusted to pass frequencies that are within a desired range of noise frequency. For example, the bandpass may extend over a window having a width of a few kilohertz, and may be centered over a range from one or two kilohertz to tens of kilohertz. The center of the frequency band is selected depending on the desired average spacing between local minima on the cut surface of the drum, and the width of the selected passband depends the desired spread of inter-minima distances. The selection of the center of the frequency band may also depend on the stroke length required of the fast servo unit 710. The stroke of length of a fast servo unit typically decreases with increased operating frequency.

It will be understood that, since the signal from the noise source 904 is filtered, the signal applied to the fast servo unit 710 is not truly random, but is pseudo-random. However, limiting the frequency of the noise signal avoids the occurrence of statistically extreme frequency excursions in the fast-x signal. Such excursions may result in the roll having a portion of relatively short inter-minimum spacing that is adjacent a portions of relatively long inter-minimum spacing, which may lead to a defect in the display that is visible to the viewer.

In one particular example of a system as illustrated in FIG. 8, a cutting tool 708 having a 64 $\mu$m radius diamond is used at a cutting pitch of 40 $\mu$m. The cutting pitch is the distance traveled by the cutting tool 708 in the z-direction during one revolution of the drum 700. The depth of the cutting tool was varied using a slow-x translation of approximately 6 $\mu$m every 1.69 revolutions of the drum, a ratio chosen to provide a constant pattern of varying depths without cyclical problems seen in using a cycle of close to, and especially slightly less than one revolution. On top of the slow-x translation is added a 3 micron random signal generated using a filtered, random noise generator. The filter passed noise in the pass band of 4 kHz to 5.6 kHz. The drum's surface speed was selected so that the nominal, or average spacing between peaks on the drum surface was approximately 170 microns.

Figure 10:
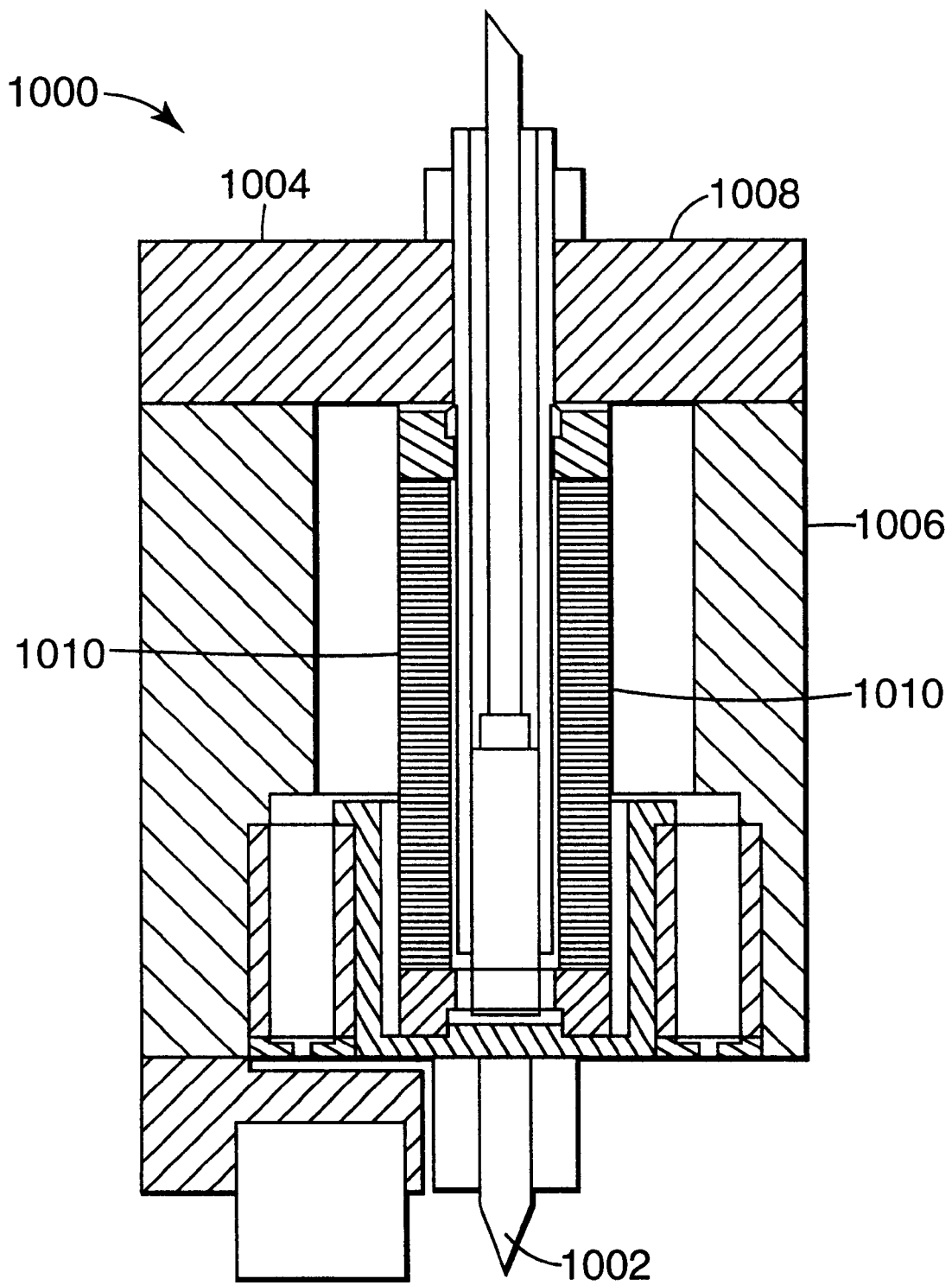
FIG. 10 illustrates a tool for use in the method of fabricating the drum illustrated in FIGS. 7 and 9.

One particular embodiment of a fast servo unit for holding a cutting tool is illustrated in FIG. 10. The fast servo unit 1000 includes a cutting tool 1002 that extends from a case 1004 having walls 1006 and back 1008. The cutting tool 1002 is supported by a stack of piezo-electric elements 1010 on either side. When the piezo electric stack 1010 is stimulated by a rapidly varying electrical signal, the cutting tool 1002 is caused to move such that the distance it extends from the case 1004 changes by a small amount. It is possible for the piezo electric stack 1010 to be stimulated by a signal of constant, programmed, or irregular frequencies. However, to generate a surface on the roll 800 having a randomly varying height, the signal applied to the piezo electric stack 1010 is typically random or pseudo-random. As used herein, the term random is understood to include pseudo-random.

EXAMPLE

A reflective polarizer film having an anti-wet-out surface was fabricated using a roll whose surface was prepared in the following manner. The roll, was rotated with a surface speed of approximately 0.8 ms$^{-1}$. The fast servo unit was operated with a signal from a noise source having a frequency in the range 4 kHz to 5.6 kHz. The stroke length of the fast servo unit was about 7 $\mu$m. A slow-x translation of about 3 $\mu$m, with a period equal to about 1.69 rotations of the roll was imposed on the fast servo unit. The diamond tool had a radius of about 50 $\mu$m, and cut a groove into the surface of the roll with a pitch of about 22–28 $\mu$m. The average sag of the cut was about 2 $\mu$m. The maximum peak to valley difference in depth, therefore, was about 12 $\mu$m (7+3+2 $\mu$m). The z-dimension of the peak between adjacent grooves did not vary smoothly around the roll, but had some fast z-variation, depending on the relative cut depth of the valleys on either side of the peak. however, the average separation between minima in the z-direction was equal to the z-pitch, i.e. 22–28 $\mu$m. The average separation between minima was approximately 175 $\mu$m in the circumferential direction along the groove.

The roll was used to form a surface on a film in an extrusion process, similar to the process illustrated in FIG. 6. The film was a multi-layer, reflective polarizer film, formed from alternating layers of PEN and CoPEN as described, for example, in published PCT Patent Applications WO95/17303, WO96/19347, WO95/17699, WO95/17692 and WO95/17691, the contents of which are incorporated herein by reference. After the film was formed, the film was stretched laterally by a factor of about 6. Accordingly, the maximum peak to valley height in the stretched film was about 2 μm (12÷6) and the average peak separation in the stretched direction was 132 μm–168 μm. The average peak separation in the direction along the groove was not affected by the stretching and remained at about 175 μm.

Figure 11A:
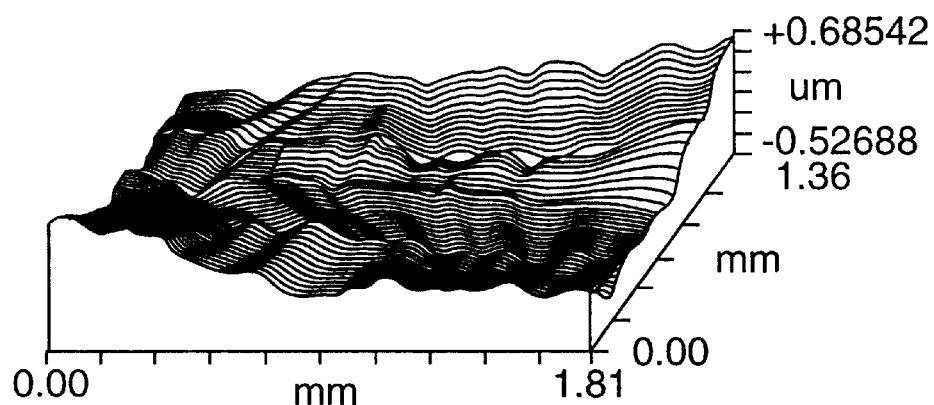
FIGS. 11A and 11B illustrate an example of a film having a surface formed according to the present invention.
Figure 11B:
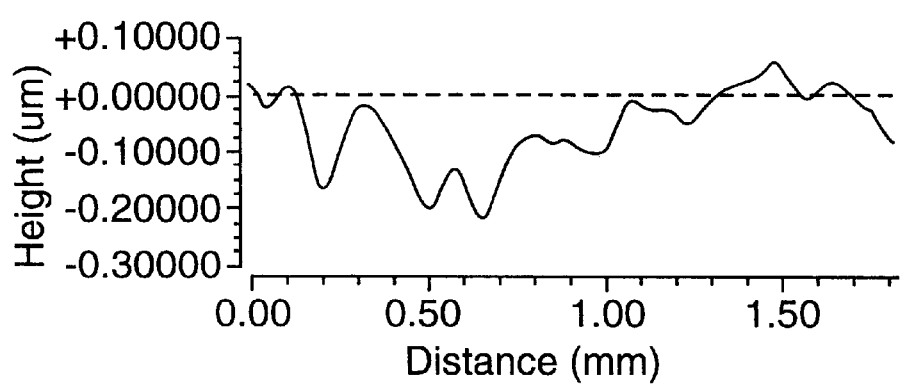

An example of an anti-wet-out surface on a film is illustrated in FIGS. 11A and 11B. The film was formed on a drum cut with a 50 μm radius diamond tool using a 25 μm pitch. The cutting tool had a 7 μm high frequency random throw, and a 3 μm slow-x throw. The film was stretched by a factor of about 5 after fabrication. A three-dimensional surface plot of the anti-wet-out surface is illustrated in FIG. 11A for a section of the film 1.81 mm (z-axis)×1.36 mm (y-axis). The stretching direction was along the y-axis. The figure shows a variation in height of approximately 1.2 μm over the sampled surface area. FIG. 11B illustrates a surface profile for a line along the surface, parallel to the z-axis. The variation in height along the length of the line profile is approximately 0.3 μm.

As noted above, the present invention is applicable to display systems and is believed to be particularly useful in reducing cosmetic defects in displays and screens having multiple light management films, such as backlighted displays and rear projection screens. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical film comprising:
   a first surface free of primary regular structure, the first surface replicated with a plurality of local height maxima, a characteristic measure of the first surface having a random value within a predetermined range;
   a second surface opposing the first surface;
   a second light management film contactable to the first surface;
   a light source to generate light incident on the first surface and the second film; and
   a light gating device disposed to receive light transmitted by the first surface and the second film;
   wherein the local maxima have actual heights and the characteristic measure is one of i) a difference between the actual heights and a nominal height ii) slope angle of the first surface proximate a local maximum.

2. An optical film as recited in claim 1, wherein the predetermined range is 5 microns when the characteristic measure is the difference between the actual heights and the nominal height.

3. An optical film as recited in claim 1, wherein the predetermined range is 1.5 microns when the characteristic measure is the difference between the actual heights and the nominal height.

4. An optical film as recited in claim 1, wherein the characteristic measure also includes an average separation between the local height maxima.

5. An optical film as recited in claim 4, wherein an average separation between local height maxima on the first surface is in the range from 50 μm to 500 μm.

6. An optical film as recited in claim 4, wherein an average separation between local height maxima on the first surface is in the range from 100 μm to 250 μm.

7. An optical film as recited in claim 1, wherein the characteristic measure is slope angle of the first surface proximate a local height maximum, in a direction relative to a preferred direction of a refractive structure on the second surface of the film.

8. An optical film as recited in claim 1, wherein the second surface includes a primary regular, refractive structure.

9. An optical film as recited in claim 8, wherein the primary regular, refractive structure includes one of a brightness enhancement prismatic structure, a lenticular structure and a Fresnel lens structure.

10. An optical film as recited in claim 8, wherein the characteristic measure is related to a preferred direction of the refractive structure on the second surface.

11. An optical film as recited in claim 1, wherein the second surface is lacking in primary regular refractive structure and is provided with replicated local height maxima.

12. An optical film as recited in claim 11, wherein actual heights of portions of the second surface have a value different from the nominal height by an amount having a random value within the predetermined range.

13. An optical film as recited in claim 1, wherein the film is a polarization sensitive film.

14. An optical film comprising:
   an anti-wet-out surface replicated on a first surface having no primary regularly refractive structure; and
   a second surface, having a primary regularly structured refracting surface, opposing the first surface.

15. A film as recited in claim 14, wherein the anti-wet-out surface includes a number of local height maxima and local height minima, an average height difference between the local height maxima and the local height minima being less than a first value.

16. A film as recited in claim 15, wherein the first value is less than 5 μm.

17. A film as recited in claim 16, wherein the first value is approximately 1.5 μm.

18. A film as recited in claim 14, wherein the second surface is also an anti-wet-out surface.

19. A film as recited in claim 14, wherein the anti-wet-out surface includes a plurality of local height maxima, each local height maximum separated from an adjacent local height maximum by a random separation value within a preselected separation range.

20. A film as recited in claim 19, wherein a line between the local height maximum and the adjacent local height maximum lies generally parallel to a selected direction.

21. A film as recited in claim 14, wherein the anti-wet-out surface includes a plurality of local height maxima and portions of the first surface proximate the local height maxima have associated surface slope angles, the surface slope angles having values within a predetermined range.

22. A film as recited in claim 21, wherein the surface slope angles measured along a specific direction relative to an axis in a plane of the film lie within the predetermined range.

23. A film as recited in claim 22, wherein the specific direction is related to a preferred direction of the regularly structured refracting surface.

24. An optical film, comprising:
   a first surface;
   replicated wet-out reducing means disposed on the first surface for reducing wet-out between the first surface and another optical surface; and
   wet out reducing means disposed on the second surface.

25. An optical film as recited in claim 24, further comprising regularly-structured refracting means on the second surface for refracting light passing through the second surface.

26. An optical device, comprising:

a light source;

a film having an anti-wet-out surface replicated on a first surface having no primary regularly refractive structure; and a second optical component having a second surface opposing the first surface;

wherein light from the light source passes through the film and the second optical component.

27. An optical device as recited in claim 26, further comprising a light guide positioned to receive light from the light source and an extractor to extract light from the light guide in a direction towards the film.

28. An optical device as recited in claim 27, further comprising at least one brightness enhancement film disposed between the light guide and the film.

29. An optical device as recited in claim 26, further comprising a liquid crystal display matrix disposed to modulate light passing therethrough from the light source.

30. An optical film comprising:

an anti-wet-out surface free of primary, regular refractive structure, the anti-wet-out surface having a plurality of local height maxima, a characteristic measure of the first surface having a quasi-random value within a predetermined range, the characteristic value having a first degree of order when measured relative to a first axis in a plane of the film, and a second degree of order different from the first degree of order when measured relative to a second axis in the plane of the film orthogonal to the first axis; and a second surface opposing the first surface.

31. An optical film as recited in claim 30, wherein the local height maxima have actual heights above neighboring local minima, and the characteristic measure is the actual height of a local maximum.

32. An optical film as recited in claim 31, wherein the predetermined range is 5 microns.

33. An optical film as recited in claim 31, wherein the predetermined range is 1.5 microns.

34. An optical film as recited in claim 30, wherein the characteristic measure is an average separation between the local height maxima.

35. An optical film as recited in claim 34, wherein the average separation between local height maxima on the first surface is in the range from 50 $\mu$m to 500 $\mu$m.

36. An optical film as recited in claim 34, wherein an average separation between local height maxima on the first surface is in the range from 100 $\mu$m to 250 $\mu$m.

37. An optical film as recited in claim 30, wherein the characteristic measure is slope angle of a portion of the first surface surrounding a local height maximum.

38. An optical film as recited in claim 30, wherein the second surface includes a primary regular, refractive structure.

39. An optical film as recited in claim 38, wherein the primary regular, refractive structure includes one of a brightness enhancement prismatic structure, a lenticular structure and a Fresnel lens structure.

40. An optical film as recited in claim 38, wherein the characteristic measure is related to a preferred direction of the refractive structure on the second surface.

41. An optical film as recited in claim 30, further comprising a second optical film contactable to the first surface, a light source to generate light passing through the first surface and the second film, and a light gating device disposed to receive light transmitted by the first surface and the second film.

42. An optical film as recited in claim 30, wherein the anti-wet-out surface is a replicated surface.

43. An optical film comprising:

a first surface free of primary regular structure, the first surface replicated with a plurality of local height maxima, a characteristic measure of the first surface having a random value within a predetermined range; and a second surface opposing the first surface;

wherein the local maxima have actual heights and the characteristic measure is an average separation between the local height maxima, and the predetermined range is from 50 $\mu$m to 500 $\mu$m.

44. An optical film as recited in claim 43, wherein the predetermined range is from 100 $\mu$m to 250 $\mu$m.

45. An optical film as recited in claim 43, wherein the second surface includes a primary regular, refractive structure.

46. An optical film as recited in claim 45, wherein the primary regular, refractive structure includes one of a brightness enhancement prismatic structure, a lenticular structure and a Fresnel lens structure.

47. An optical film as recited in claim 45, wherein the characteristic measure is related to a preferred direction of the refractive structure on the second surface.

48. An optical film as recited in claim 43, wherein the second surface is lacking in primary regular refractive structure and is provided with replicated local height maxima.

49. An optical film as recited in claim 48, wherein actual heights of portions of the second surface have a value different from the nominal height by an amount having a random value within the predetermined range.

50. An optical film as recited in claim 43, wherein the optical film is polarization sensitive.

51. An optical film as recited in claim 43, further comprising a second light management film contactable to the first surface, a light source to generate light incident on the first surface and the second film, and a light gating device disposed to receive light transmitted by the first surface and the second film.

52. An optical film comprising:

a first surface free of primary regular structure, the first surface replicated with a plurality of local height maxima, a characteristic measure of the first surface having a random value within a predetermined range;

wherein the optical film is polarization sensitive and local maxima have actual heights and the characteristic measure is one of i) a difference between the actual heights and a nominal height ii) slope angle of the first surface proximate a local maximum.

53. An optical film as recited in claim 52, wherein the predetermined range is 5 microns when the characteristic measure is the difference between the actual heights and the nominal height.

54. An optical film as recited in claim 52, wherein the predetermined range is 1.5 microns when the characteristic measure is the difference between the actual heights and the nominal height.

55. An optical film as recited in claim 52, wherein the characteristic measure also includes an average separation between the local height maxima.

56. An optical film as recited in claim 52, wherein an average separation between local height maxima on the first surface is in the range from 50 $\mu$m to 500 $\mu$m.

57. An optical film as recited in claim 56, wherein the average separation is in the range from 100 $\mu$m to 250 $\mu$m.

58. An optical film as recited in claim 52, wherein the characteristic measure is slope angle of the first surface proximate a local height maximum, in a direction relative to a preferred direction of a refractive structure on the second surface of the film.

59. An optical film as recited in claim 52, wherein the second surface includes a primary regular, refractive structure.

60. An optical film as recited in claim 59, wherein the characteristic measure is related to a preferred direction of the refractive structure on the second surface.

61. An optical film as recited in claim 52, wherein the second surface is lacking in primary regular refractive structure and is provided with replicated local height maxima.

62. An optical film as recited in claim 52, wherein actual heights of portions of the second surface have a value different from the nominal height by an amount having a random value within the predetermined range.

63. An optical film as recited in claim 52, further comprising a second light management film contactable to the first surface, a light source to generate light incident on the first surface and the second film, and a light gating device disposed to receive light transmitted by the first surface and the second film.

* * * * *